(12) United States Patent
Chen et al.

(10) Patent No.: US 12,048,039 B2
(45) Date of Patent: Jul. 23, 2024

(54) ELECTRONIC SYSTEM, CONTROL METHOD AND NON- TRANSITORY COMPUTER READABLE STORAGE MEDIUM

(71) Applicant: HTC Corporation, Taoyuan (TW)

(72) Inventors: Kai-Hsiu Chen, Taoyuan (TW); WeiChih Kuo, Taoyuan (TW); Wei-Shen Ou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 98 days.

(21) Appl. No.: 17/822,430

(22) Filed: Aug. 26, 2022

(65) Prior Publication Data

US 2024/0073981 A1    Feb. 29, 2024

(51) Int. Cl.
| | |
|---|---|
| *G06V 10/00* | (2022.01) |
| *G06V 10/44* | (2022.01) |
| *G06V 10/77* | (2022.01) |
| *H04N 23/90* | (2023.01) |
| *H04W 48/08* | (2009.01) |

(Continued)

(52) U.S. Cl.
CPC .......... *H04W 76/15* (2018.02); *G06V 10/443* (2022.01); *G06V 10/7715* (2022.01); *H04N 23/90* (2023.01); *H04W 48/08* (2013.01); *H04W 76/34* (2018.02); *H04W 84/18* (2013.01)

(58) Field of Classification Search
CPC ..... H04W 76/15; H04W 48/08; H04W 76/34; H04W 84/18; G06V 10/443; G06V 10/7715; H04N 23/90
See application file for complete search history.

(56) References Cited

U.S. PATENT DOCUMENTS

| | | | |
|---|---|---|---|
| 2016/0132716 A1* | 5/2016 | Cheng | G06V 20/64 382/103 |
| 2016/0259052 A1* | 9/2016 | Kirmani | G01S 15/89 |

(Continued)

FOREIGN PATENT DOCUMENTS

| | | |
|---|---|---|
| CN | 107018554 B | 11/2020 |
| CN | 108427479 B | 1/2021 |
| CN | 112785700 A | 5/2021 |

OTHER PUBLICATIONS

The office action of the corresponding Taiwanese application No. TW112107087 issued on Nov. 8, 2023.

*Primary Examiner* — Frank F Huang
(74) *Attorney, Agent, or Firm* — CKC & Partners Co., LLC

(57) ABSTRACT

The present disclosure provides a control method applied to a first electronic device and a second electronic device in a physical environment. The first electronic device and the second electronic device are configured to communicate with each other through a first wireless connection established between the first electronic device and the second electronic device. The control method includes: by at least one of the first electronic device and the second electronic device, determining whether to update a map of the physical environment; and in response to a determination to update the map of the physical environment, establishing a second wireless connection different from the first wireless connection between the first electronic device and the second electronic device, wherein the second wireless connection is configured to transmit a map updated data, and the map updated data is configured to update the map of the physical environment.

20 Claims, 7 Drawing Sheets

(51) Int. Cl.
  *H04W 76/15* (2018.01)
  *H04W 76/34* (2018.01)
  *H04W 84/18* (2009.01)

(56) References Cited

U.S. PATENT DOCUMENTS

2016/0367336 A1* 12/2016 Lv .......................... A61B 6/032
2017/0024874 A1*  1/2017 Pang .................... G06V 40/113
2020/0302639 A1*  9/2020 Park ....................... G06T 7/246

* cited by examiner

ELECTRONIC SYSTEM, CONTROL METHOD AND NON- TRANSITORY COMPUTER READABLE STORAGE MEDIUM

BACKGROUND

Field of Invention

This disclosure relates to a system and control method thereof, and in particular to an electronic system and control method thereof.

Description of Related Art

The system of virtual reality (VR), augmented reality (AR) and/or mixed reality (MR) is always implemented by multiple electronic devices (e.g., head-mounted device (HMD), controller, tracker, etc.). The electronic devices may communicate with each other through a high-bandwidth communication (e.g., a Wi-Fi connection), so as to share a large amount of data (e.g., the information of the environment where the electronic devices are). However, the electronic devices can be easily led to power failure when maintaining such high-bandwidth communication. For this reason, it is essential to improve the system of VR, AR and/or MR.

SUMMARY

An aspect of present disclosure relates to a control method. The control method is applied to a first electronic device and a second electronic device in a physical environment, wherein the first electronic device and the second electronic device are configured to communicate with each other through a first wireless connection established between the first electronic device and the second electronic device, and the control method includes: by at least one of the first electronic device and the second electronic device, determining whether to update a map of the physical environment; and in response to a determination to update the map of the physical environment, establishing a second wireless connection different from the first wireless connection between the first electronic device and the second electronic device, wherein the second wireless connection is configured to transmit a map updated data, and the map updated data is configured to update the map of the physical environment.

Another aspect of present disclosure relates to an electronic system. The electronic system is configured to be operated in a physical environment and includes a first electronic device and a second electronic device. The first electronic device and the second electronic device are configured to communicate with each other through a first wireless connection established between the first electronic device and the second electronic device and are configured to establish a second wireless connection different from the first wireless connection between the first electronic device and the second electronic device in response to a determination to update a map of the physical environment, wherein the map of the physical environment is determined to be updated by at least one of the first electronic device and the second electronic device. In response to the determination to update the map of the physical environment, a map updated data is generated to update the map of the physical environment and is configured to be transmitted through the second wireless connection instead of the first wireless connection.

Another aspect of present disclosure relates to a non-transitory computer readable storage medium with a computer program to execute a control method. The control method is applied to a first electronic device and a second electronic device in a physical environment, wherein the first electronic device and the second electronic device are configured to communicate with each other through a first wireless connection established between the first electronic device and the second electronic device, and the control method includes: by at least one of the first electronic device and the second electronic device, determining whether to update a map of the physical environment; and in response to a determination to update the map of the physical environment, establishing a second wireless connection different from the first wireless connection between the first electronic device and the second electronic device, wherein the second wireless connection is configured to transmit a map updated data, and the map updated data is configured to update the map of the physical environment.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

As used herein, "coupled" and "connected" may be used to indicate that two or more elements physical or electrical contact with each other directly or indirectly, and may also be used to indicate that two or more elements cooperate or interact with each other.

Figure 1:
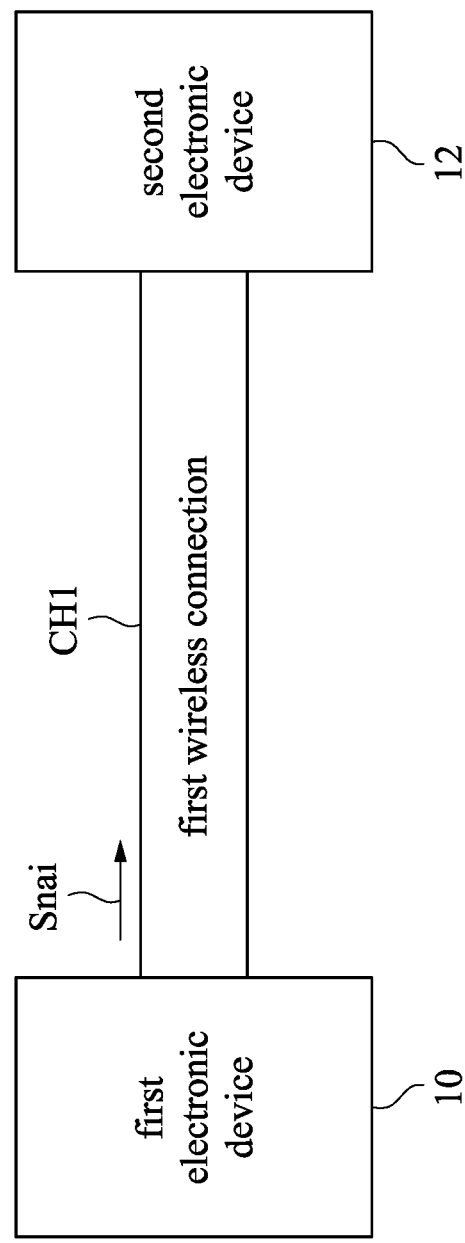
FIG. 1 is a block diagram of an electronic system in accordance with some embodiments of the present disclosure.

Referring to FIG. 1, FIG. 1 is a block diagram of an electronic system 100 in accordance with some embodiments of the present disclosure. In some embodiments, the electronic system 100 is configured to be operated in a physical environment (e.g., a space or room where a user operates the electronic system 100) and includes a first electronic device 10 and a second electronic device 12. As shown in FIG. 1, the first electronic device 10 and the second electronic device 12 are configured to communicate with each other through a first wireless connection CH1 established between the first electronic device 10 and the second electronic device 12.

Figure 2:
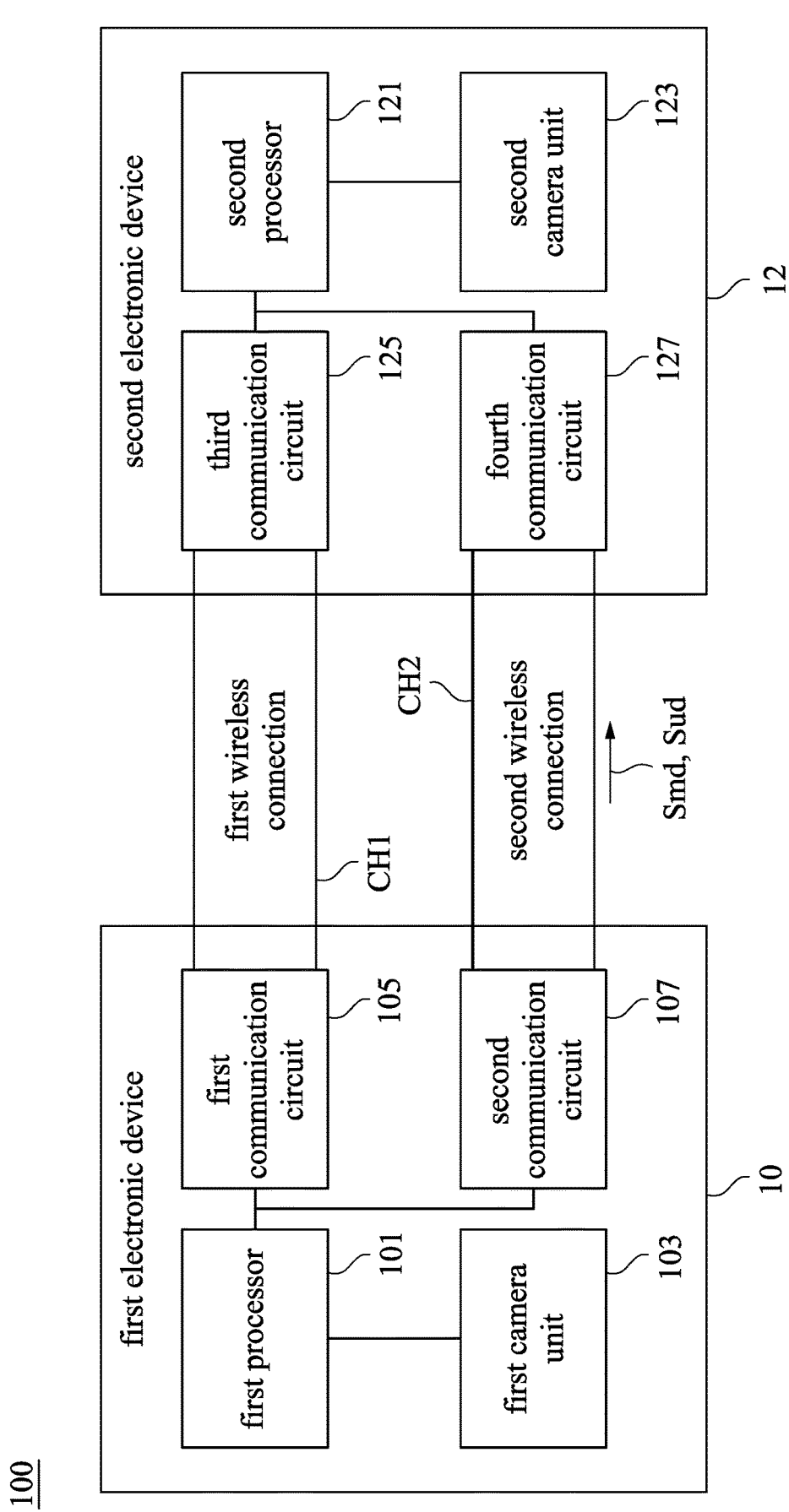
FIG. 2 is another block diagram of the electronic system in accordance with some embodiments of the present disclosure.

Referring to FIG. 2, FIG. 2 is another block diagram of the electronic system 100 in accordance with some embodiments of the present disclosure. In some embodiments, the first electronic device 10 and the second electronic device 12 are configured to establish a second wireless connection CH2 between the first electronic device 10 and the second electronic device 12 in certain conditions (e.g., transmitting a large amount of data). In other words, the first wireless connection CH1 and the second wireless connection CH2 may exist simultaneously in certain conditions. It can be appreciated that the second wireless connection CH2 is different from the first wireless connection CH1 in communication protocol. In particular, the first wireless connection CH1 is less than the second wireless connection CH2 in power consumption and transmission bandwidth. For example, the first wireless connection CH1 is a Bluetooth Low Energy (BLE) connection, and the second wireless connection CH2 is a Wi-Fi connection. However, the present disclosure is not limited thereto.

In the embodiments of FIG. 2, the first electronic device 10 includes a first processor 101, a first camera unit 103, a first communication circuit 105 and a second communication circuit 107. The first processor 101 is coupled to the first camera unit 103, the first communication circuit 105 and the second communication circuit 107. The second electronic device 12 includes a second processor 121, a second camera unit 123, a third communication circuit 125 and a fourth communication circuit 127. The second processor 121 is coupled to the second camera unit 123, the third communication circuit 125 and the fourth communication circuit 127. In particular, the first processor 101 and the second processor 121 each can be implemented by a central processing unit (CPU), an application-specific integrated circuit (ASIC), a microprocessor, a system on a Chip (SoC) or other suitable processing unit.

As shown in FIG. 2, the first communication circuit 105 and the third communication circuit 125 are configured to establish the first wireless connection CH1, and the second communication circuit 107 and the fourth communication circuit 127 are configured to establish the second wireless connection CH2. It can be appreciated that the first communication circuit 105 and the third communication circuit 125 each can be implemented by a BLE transceiver or other suitable wireless communication transceiver, and the second communication circuit 107 and the fourth communication circuit 127 each can be implemented by a Wi-Fi transceiver or other suitable wireless communication transceiver.

Figure 3A:
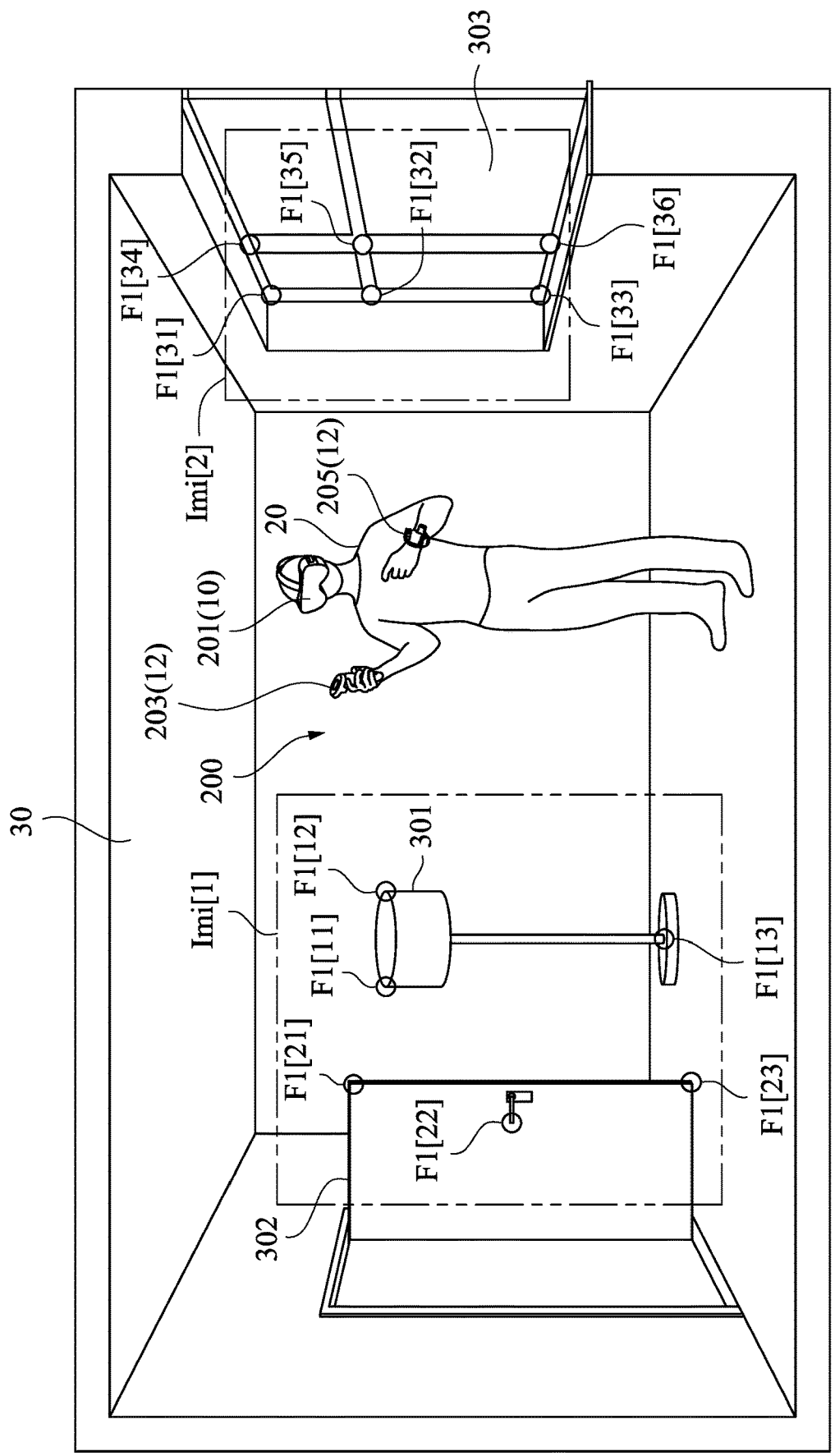
FIG. 3A is a schematic diagram of a multimedia system operated by a user in a physical environment according to some embodiments of the present disclosure.

Referring to FIG. 3A, FIG. 3A is a schematic diagram of a multimedia system 200 operated by a user 20 in a physical environment 30 according to some embodiments of the present disclosure. In some embodiments, the multimedia system 200 includes a head-mounted device (HMD) 201, a controller 203 and a tracker 205. The HMD 201, the controller 203 and the tracker 205 can communicate with each other.

As shown in FIG. 3A, the user 20 wears the HMD 201 on his/her head, holds the controller 203 with his/her right hand, and mounts the tracker 205 on his/her left wrist through a wrist strap. The HMD 201 is configured to display a virtual environment (not shown) including at least one virtual object to the user 20. In particular, the virtual environment may be a completely immersed virtual reality (VR) environment, an augmented reality (AR) environment augmenting the physical environment 30 perceived by the user with the virtual object or a mixed reality (MR) environment merging multiple elements of both AR and VR to enable the virtual object co-existing and interacting with real objects. The user 20 can control the virtual object displayed by the HMD 201 by operating the controller 203 or by making movements with his/her left arm where the tracker 205 is mounted. It can be appreciated that the tracker 205 is not limited to be mounted on the user 20, for example, the tracker 205 can be mounted on a real object (e.g., the sporting equipment) operated by the user 20. In such way, the HMD 201 can track and locate the real object operated by the user 20 through the tracker 205. In some embodiments, the HMD 201 and the tracker 205 each is configured to receive a signal (e.g., invisible light) from a base station (not shown) of the multimedia system 200. The HMD 201 can calculate its position with respect to the base station according to the received signal. Also, the HMD 201 can calculate a position of the tracker 205 with respect to the base station according to information of the signal received by the tracker 205. Accordingly, the HMD 201 can track and locate the object (e.g., the arm of the user or the sporting equipment) on which the tracker 205 is mounted according to its position and the position of the tracker 205.

In some embodiments, the electronic system 100 includes a first electronic device 10 and a plurality of second electronic devices 12. The first communication circuit 105 of the first electronic device 10 may establish the first wireless connection CH1 with each second electronic device 12, and the second communication circuit 107 of the first electronic device 10 may establish the second wireless connection CH2 with each second electronic device 12. As shown in FIG. 3A, the first electronic device 10 of the electronic system 100 is implemented by the HMD 201, and the second electronic devices 12 of the electronic system 100 are implemented by the tracker 205 and the controller 203. Since the second electronic devices 12 may have similar operations, the following embodiments would be described with the first electronic device 10 implemented by the HMD 201 and one of the second electronic devices 12 implemented by the tracker 205, for the convenience of description.

In some embodiment, the first electronic device 10 (i.e., the HMD 201) is configured to generate a map of the physical environment 30. In particular, as shown in FIG. 3A, the first electronic device 10 can utilize the first camera unit 103 to capture a plurality of initial images Imi of the physical environment 30. For simplification of descriptions, FIG. 3A illustrates two initial images Imi[1]-Imi[2] only. Furthermore, the first electronic device 10 can utilize the first processor 101 to analyze the initial images Imi, so as to generate or construct the map of the physical environment 30.

In some embodiments, the first processor 101 utilizes simultaneous localization and mapping (SLAM) technology to analyze the initial images Imi. By the SLAM technology, the first processor 101 is configured to extract a plurality of first feature points F1 from the initial images Imi. The initial image Imi[1] in FIG. 3A is taken as an example, the first processor 101 extracts three first feature points F1[11]-F1[13] of a real object 301 (e.g., a lamp) and three first feature points F1[21]-F1[23] of a real object 302 (e.g., a door) from the initial image Imi[1]. The initial image Imi[2] in FIG. 3A is taken as another example, the first processor 101 extracts six first feature points F1[31]-F1[36] of a real object 303 (e.g., a window) from the initial image Imi[2]. The extraction of the first feature points F1 from the initial images Imi would not be described in detail because the SLAM technology is well known to the person skilled in the art of the present disclosure.

Figure 3B:
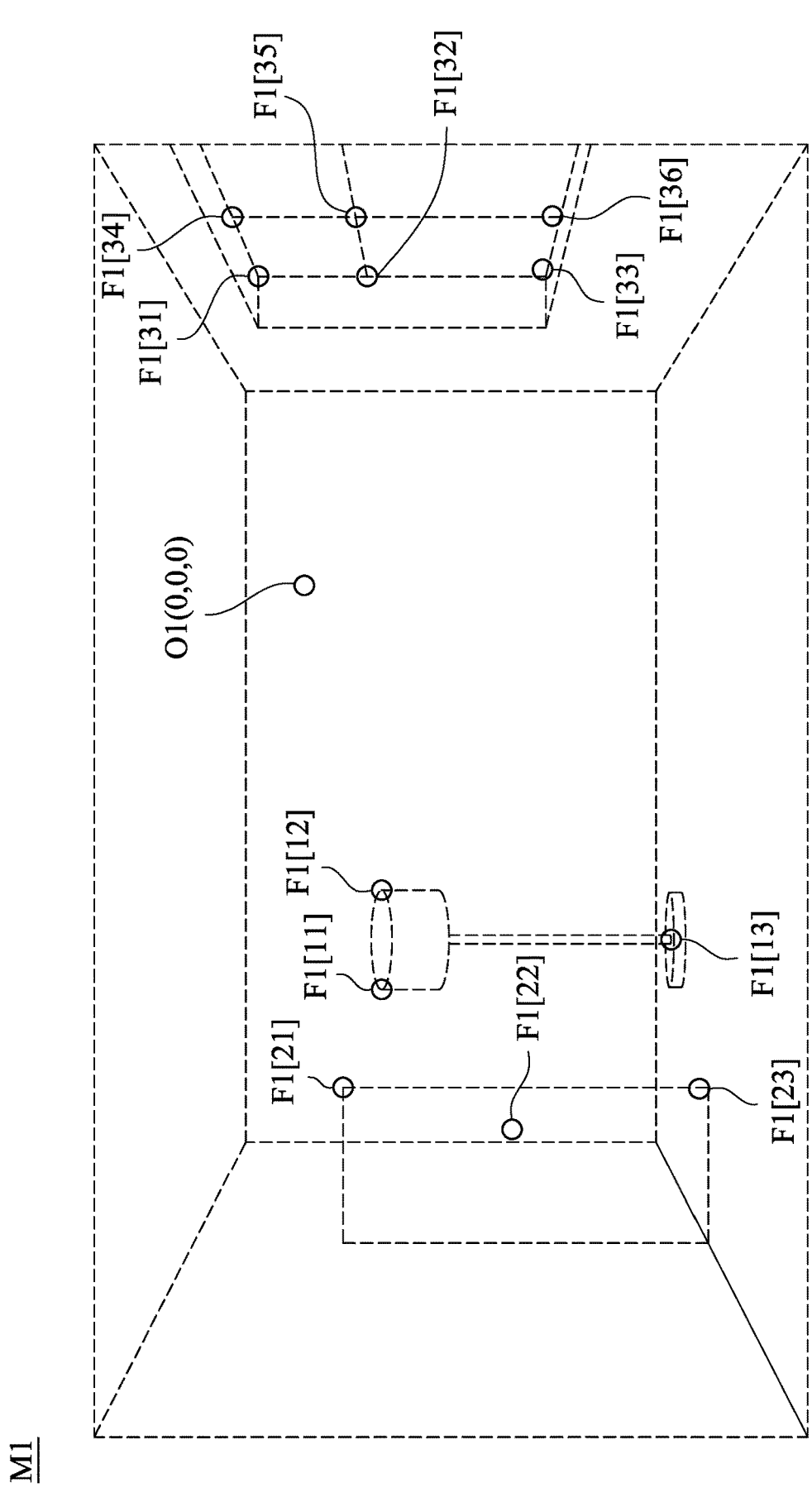
FIG. 3B is a schematic diagram of a map of the physical environment of in accordance with some embodiments of the present disclosure.

Then, the first processor 101 is configured to construct the map of the physical environment 30 according to the first feature points F1 extracted from the initial images Imi. For example, referring to FIG. 3B, FIG. 3B is a schematic diagram of a map M1 of the physical environment 30 in accordance with some embodiments of the present disclosure. In the embodiments of FIG. 3B, a point O1 represents the position of the first electronic device 10 in the physical environment 30. The first processor 101 is configured to set the point O1 as an origin of a three-dimensional coordinate system of the map M1, that is, the coordinate of the point O1 is (0, 0, 0). After setting the origin of the coordinate system of the map M1, the first processor 101 can determine the coordinate of the first feature point F1[11] through the relative location relationship between the first electronic device 10 and the first feature point F1[11]. The coordinates of the remaining first feature point F1[12]-F1[13], F1[21]-F1[23] and F1[31]-F1[36] can be determined by analogy, and therefore the descriptions thereof are omitted herein. The construction of the map M1 of the physical environment 30 by the SLAM technology is not described in detail because it is well known to the person skilled in the art of the present disclosure.

In some embodiment, after the map M1 of the physical environment 30 is generated, the first electronic device 10 locates itself in the physical environment 30 according to the map M1 by the SLAM technology and/or the micro-location technology. In some embodiments, the first electronic device 10 would share the map M1 of the physical environment 30 with the second electronic device 12, so that the second electronic device 12 can also locate itself in the physical environment 30. Because the map M1 has a large amount of data, the first electronic device 10 and the second electronic device 12 would establish the second wireless connection CH2 therebetween to share the map M1 through the second wireless connection CH2. As shown in FIG. 2, the first electronic device 10 can transmit a map data Smd corresponding to the map M1 of the physical environment 30 to the second electronic device 12 through the second wireless connection CH2 instead of the first wireless connection CH1. In other words, in response to the generation of the map M1 of the physical environment 30 (i.e., the certain condition), the second wireless connection CH2 is established between the first electronic device 10 and second electronic device 12.

In the above embodiments, the map M1 of the physical environment 30 is generated and shared with the second electronic device 12 by the first electronic device 10, but the present disclosure is not limited herein. In other embodiments, the second electronic device 12 generates the map M1 of the physical environment 30 and shares the map M1 of the physical environment 30 with the first electronic device 10. The operations of the second electronic device 12 are omitted herein because it is similar to those of the first electronic device 10.

In the above embodiments, the first electronic device 10 and second electronic device 12 are configured to establish the second wireless connection CH2 in response to the generation of the map M1 of the physical environment 30. However, the present disclosure is not limited thereto. For example, in some embodiments, the first electronic device 10 and second electronic device 12 are configured to establish the second wireless connection CH2 in response to a determination to update the map M1 of the physical environment 30 (i.e., the certain condition), which would be described in detail below with reference to FIG. 4.

Figure 4:
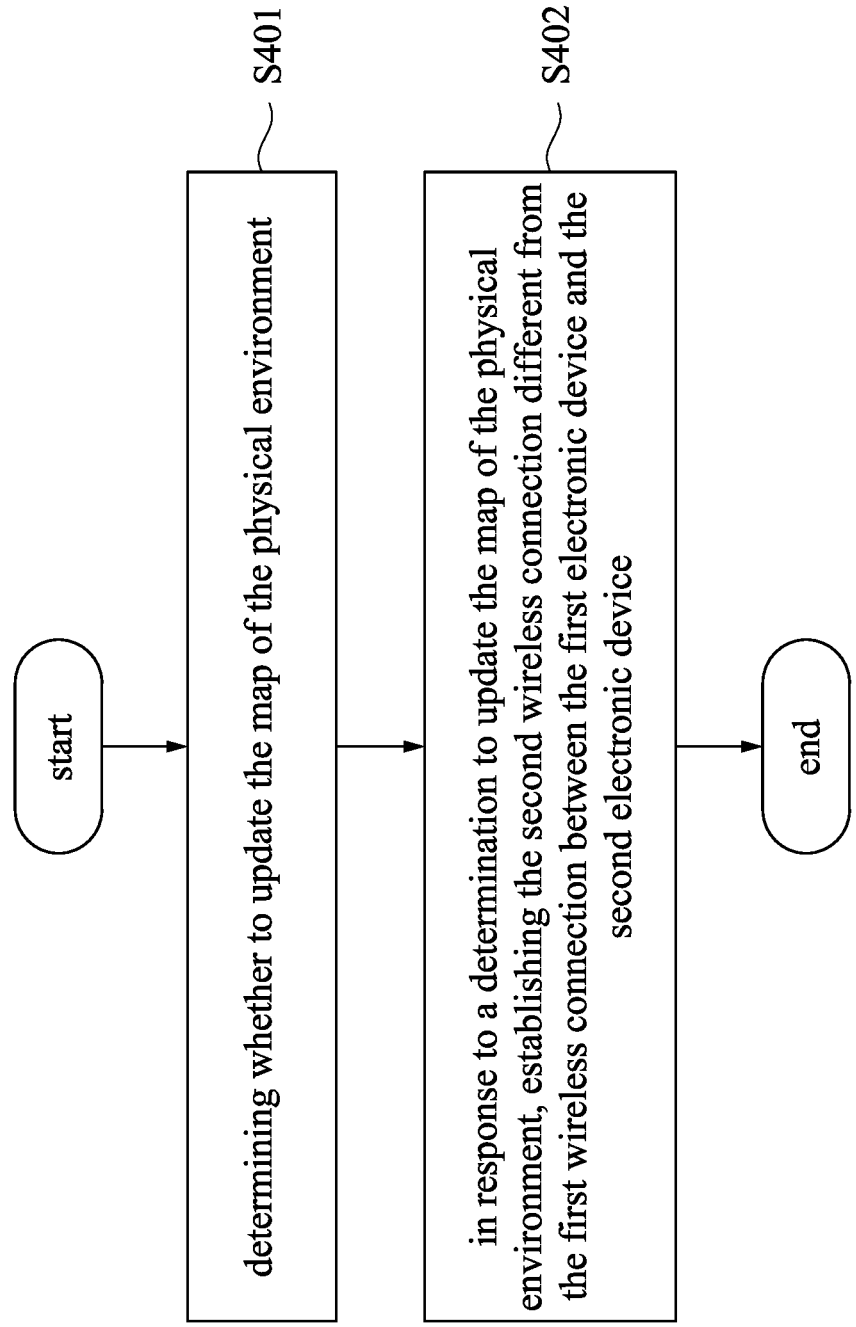
FIG. 4 is a flow diagram of a control method in accordance with some embodiments of the present disclosure.

Referring to FIG. 4, FIG. 4 is a flow diagram of a control method 400 in accordance with some embodiments of the present disclosure. The control method 400 can be applied to the first electronic device 10 and the second electronic device 12 of the electronic system 100 of FIGS. 1 and 2. As shown in FIG. 4, the control method 400 includes steps S401-S402.

In step S401, at least one of the first electronic device 10 and second electronic device 12 determines whether to update the map M1 of the physical environment 30. In some embodiments, at least one of the first electronic device 10 and second electronic device 12 determines to update the map M1 of the physical environment 30 when detecting a difference between the map M1 of the physical environment 30 and a current feature point map of the physical environment 30. In particular, the current feature point map of the physical environment 30 is generated by at least one of the first electronic device 10 and the second electronic device 12 at a certain time or periodically after the generation of the map M1. The generation of the current feature point map would be described in detail below with reference to FIGS. 5A and 5B.

Figure 5A:
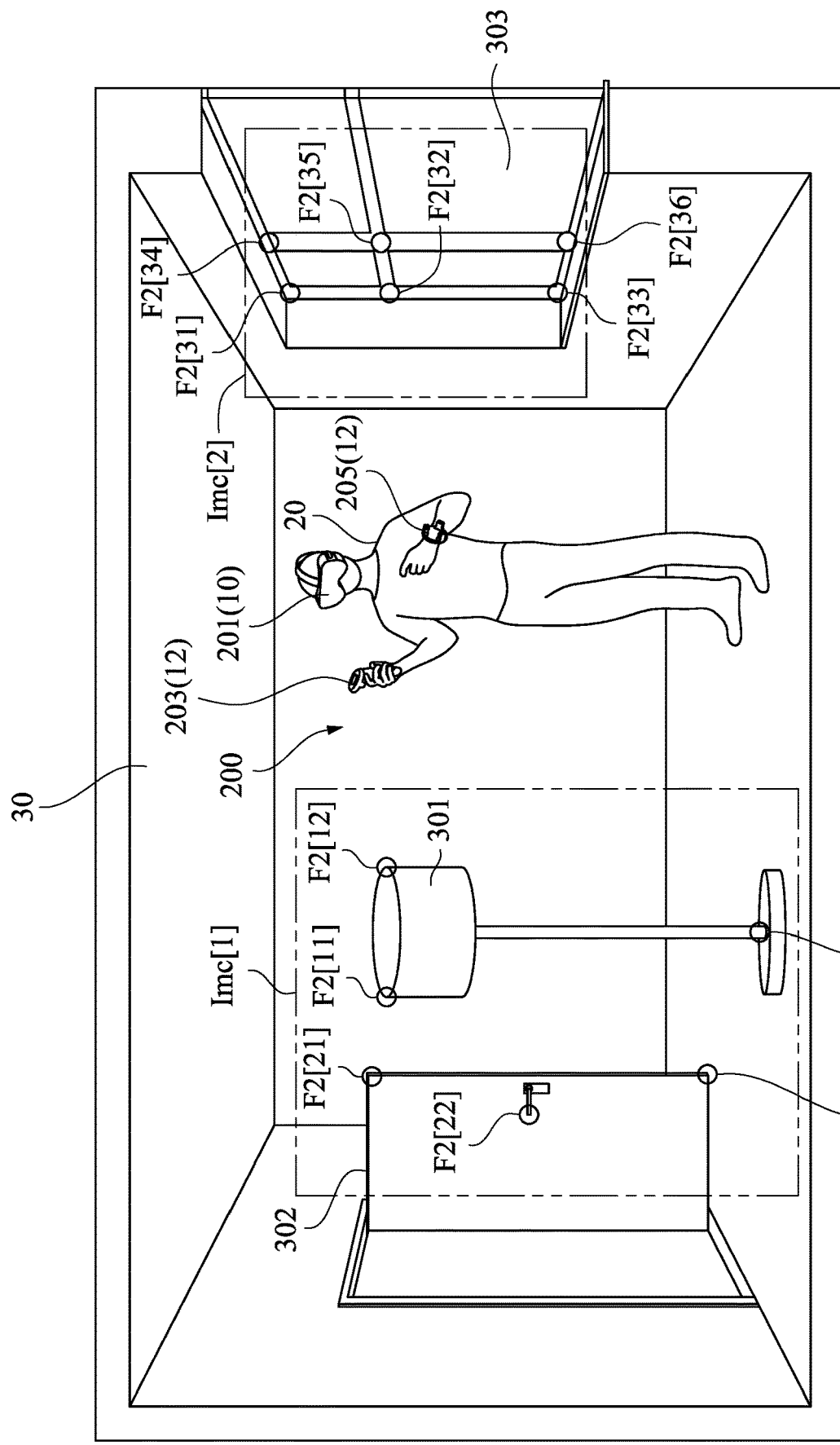
FIG. 5A is a schematic diagram of the physical environment at a certain time after the generation of the map in accordance with some embodiments of the present disclosure.

Referring to FIG. 5A, FIG. 5A is a schematic diagram of the physical environment 30 at the certain time after the generation of the map M1 in accordance with some embodiments of the present disclosure. In some embodiments, at certain time after the generation of the map M1, the real object 301 is moved to the position as shown in FIG. 5A, and the user 20 is still in the same position as that in FIG. 3A. At the same time, the first electronic device 10 and/or the second electronic device 120 is configured to capture a plurality of current images Imc of the physical environment 30 through the first camera unit 103 and is then configured to analyze the current images Imc through the first processor 101 and/or the second processor 121. For simplification of descriptions, FIG. 5A illustrates two current images Imc[1]-Imc[2] only.

In some embodiments, the first processor 101 of the first electronic device 10 utilizes the SLAM technology to analyze the current images Imc. By the SLAM technology, the first processor 101 is configured to extract a plurality of second feature points F2 from the current images Imc. The current image Imc[1] in FIG. 5A is taken as an example, the first processor 101 extracts three second feature points F2[11]-F2[13] of the real object 301 and three second feature points F2[21]-F2[23] of the real object 302 from the current image Imc[1]. The current image Imc[2] in FIG. 5A is taken as another example, the first processor 101 extracts six second feature points F2[31]-F2[36] of the real object 303 from the current image Imc[2]. The extraction of the second feature points F2 from the current images Imc would not be described in detail because the SLAM technology is well known to the person skilled in the art of the present disclosure.

Figure 5B:
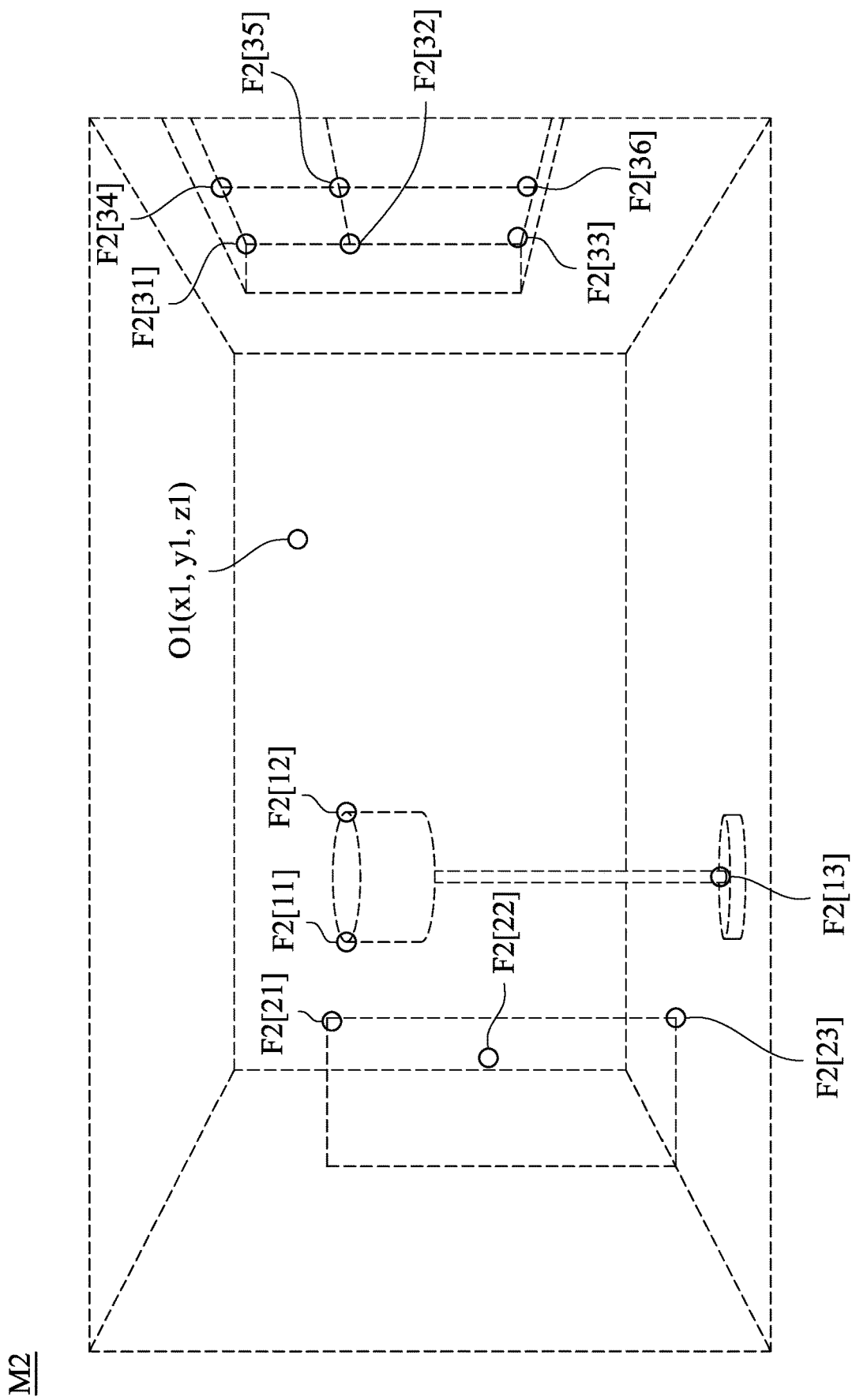
FIG. 5B is a schematic diagram of a current feature point map of the physical environment in accordance with some embodiments of the present disclosure.

Then, the first processor 101 is configured to construct the current feature point map of the physical environment 30 according to the second feature points F2 extracted from the current images Imc. For example, referring to FIG. 5B, FIG. 5B is a schematic diagram of a current feature point map M2 of the physical environment 30 in accordance with some embodiments of the present disclosure. In some embodiments, the first electronic device 10 may further includes multiple sensors (e.g., a gyroscope, an accelerometer, etc.), and the sensors are configured to sense the movement of the first electronic device 10 to generate at least one movement information of the first electronic device 10. The first electronic device 10 may first locate itself in the physical environment 30 according to the origin of the map M1 and the at least one movement information. Accordingly, the first electronic device 10 may find its position (i.e., the point O1). For example, the coordinate of the point O1 in FIG. 5B is set to be (x1, y1, z1). It can be appreciated that x1, y1 and z1 each can be an integer or floating-point number. Then, the first processor 101 can determines the coordinates of the second feature points F2 through the relative location relationship between the first electronic device 10 and the second feature points F2. The construction of the current feature point map M2 of the physical environment 30 by the SLAM technology is not described in detail because it is well known to the person skilled in the art of the present disclosure.

In some embodiments, in order to detect the difference between the map M1 of the physical environment 30 and the current feature point map M2 of the physical environment 30, the first processor 101 is configured to match the second feature points F2 to the first feature points F1 to obtain an amount of the second feature points F2 which match the first feature points F1. In particular, referring to FIGS. 3B and 5B together, the first processor 101 would determine that the second feature points F2[11]-F2[13] do not match the first feature points F1[11]-F1[13] and would determine that the second feature points F2[21]-F2[23] and F2[31]-F2[36] match the first feature points F1[21]-F1[23] and F1[31]-F1[36]. That is, in the embodiments of FIG. 5B, the amount of the second feature points F2 which match the first feature points F1 is 9.

Afterward, the first processor 101 is configured to determine whether the amount of the second feature points F2 which match the first feature points F1 is less than an amount threshold. If the amount of the second feature points F2 which match the first feature points F1 is not less than the amount threshold, the first processor 101 determines that the current feature point map M2 is not different from the map M1, that is, the first processor 101 does not detect the difference between the current feature point map M2 and the map M1. Furthermore, if the amount of the second feature points F2 which match the first feature points F1 is less than the amount threshold, the first processor 101 determines that the current feature point map M2 is different from the map M1. In other words, the first processor 101 detects the difference between the current feature point map M2 and the map M1 and hence determines to update the map M1 shared by the first electronic device 10 and the second electronic device 12. Because the data for updating the map M1 is large in amount, step S402 is executed.

In step S402, the first electronic device 10 and second electronic device 12 establishes the second wireless connection CH2 different from the first wireless connection Ch1 between the first electronic device 10 and second electronic device 12 in response to a determination to update the map M1 of the physical environment 30.

In order to establish the second wireless connection CH2, in some embodiments, the first electronic device 10 is configured to function as a network access point. For example, the first processor 101 can turn on the second communication circuit 107 and can enable a wireless network sharing function of the second communication circuit 107, so that the second communication circuit 107 can share the network provided by the internet service provider (ISP). Then, as shown in FIG. 1, the first electronic device 10 is configured to send network access information Snai to the second electronic device 12 through the first wireless connection CH1. In particular, the network access information Snai may include a media access control (MAC) address, a service set identifier (SSID), a physical layer (PHY) type, a bandwidth, a data rate, a channel, a frequency, an authentication information (e.g. password), or any combination thereof.

After receiving the network access information Snai, the second processor 121 would turn on the fourth communication circuit 127 and may utilize the fourth communication circuit 127 to send a network access request (not shown) to the first electronic device 10 according to the network access information Snai. Accordingly, the first electronic device 10 can confirm that the second electronic device 12 is a correct connection device according to the network access request. For example, the first electronic device 10 can check a password carried by the network access request against a password set by the first electronic device 10, so as to confirm that the second electronic device 12 is the correct connection device.

After the second electronic device 12 is confirmed, the second communication circuit 107 and the fourth communication circuit 127 establish the second wireless connection CH2 between the first electronic device 10 and second electronic device 12. As shown in FIG. 2, the second wireless connection CH2 is configured to transmit a map update data Sud from the first electronic device 10 to the second electronic device 12. It can be appreciated that the map update data Sud is generated in response to the determination to update the map M1 of the physical environment 30 and is configured to update the map M1 of the physical environment 30. In some embodiments, the first electronic device 11 updates the map M1 according to the difference between the current feature point map M2 and the map M1 and further generate the map update data Sud according to the operation of updating the map M1. Then, the first electronic device 11 transmits the map update data Sud to the second electronic device 12 via the second wireless connection CH2, so that the second electronic device 12 can use the map update data Sud to update the map M1 stored therein. For example, the map update data Sud can update the coordinates of the first feature points F1 of the map M1 which is stored in the second electronic device 12.

In the above embodiments, the first electronic device 10 generates the current feature point map M2 and detects the difference between the map M1 and the current feature point map M2, but the present disclosure is not limited thereto. In other embodiments, the second electronic device 12 generates the current feature point map M2 and detects the difference between the map M1 and the current feature point map M2. When the second electronic device 12 generates the current feature point map M2 and detects the difference between the map M1 and the current feature point map M2, the map update data Sud shown in FIG. 2 would be transmitted by the second wireless connection CH2 from the second electronic device 12 to the first electronic device 10.

Also, in the above embodiments, the first electronic device 10 functions as the network access point and provides the network access information Snai to the second electronic device 12, but the present disclosure is not limited thereto. In other embodiments, the second electronic device 12 functions as the network access point and provides the network access information Snai to the first electronic device 10.

Furthermore, in the embodiments of FIG. 2, both the first electronic device 10 and the second electronic device 12 have the camera unit (i.e., the first camera unit 103 and the second camera unit 123), but the present disclosure is not limited thereto. For example, in the embodiments that the first electronic device 10 generates the map M1 and the current feature point map M2 of the physical environment 30, the second camera unit 123 can be omitted from the second electronic device 12. For another example, in the embodiments that the second electronic device 12 generates the map M1 and the current feature point map M2 of the physical environment 30, the first camera unit 103 can be omitted from the first electronic device 10.

Notably, in some embodiments, when a transmission of the map updated data Sud or the map data Smd is completed, the second wireless connection CH2 is disconnected. In particular, the second communication circuit 107 and the fourth communication circuit 127 would be turned off or disabled, so that the second wireless connection CH2 is turned off or disabled.

In sum, by establishing the high power consumption communication (i.e., Wi-Fi connection) only when the map of the physical environment is required to be updated or shared, the electronic system of the present disclosure has the advantage of significant power saving. Furthermore, by sending the network access information through the low power consumption communication (i.e., BLE connection) to establish the high power consumption communication, multiple electronic devices of the electronic system do not need to periodically broadcast the beacon signal therebetween, so as to save more power.

The disclosed methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the at least one processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A control method applied to a first electronic device and a second electronic device in a physical environment, wherein the first electronic device and the second electronic device are configured to communicate with each other through a first wireless connection established between the first electronic device and the second electronic device, and the control method comprises:

by at least one of the first electronic device and the second electronic device, determining whether to update a map of the physical environment; and in response to a determination to update the map of the physical environment, establishing a second wireless connection different from the first wireless connection between the first electronic device and the second electronic device, wherein the second wireless connection is configured to transmit a map updated data, and the map updated data is configured to update the map of the physical environment.

2. The control method of claim 1, wherein determining whether to update the map of the physical environment comprises:

determining to update the map of the physical environment when detecting a difference between the map of the physical environment and a current feature point map, wherein the current feature point map is generated by at least one of the first electronic device and the second electronic device after a generation of the map of the physical environment.

3. The control method of claim 2, wherein the map of the physical environment comprises a plurality of first feature points, and detecting the difference between the map of the physical environment and the current feature point map comprises:

capturing a plurality of current images of the physical environment;

extracting a plurality of second feature points from the plurality of current images to generate the current feature point map;

matching the plurality of second feature points to the plurality of first feature points to obtain an amount of the plurality of second feature points which match the plurality of first feature points; and determining that the current feature point map is different from the map of the physical environment when the amount is less than an amount threshold.

4. The control method of claim 1, wherein the first wireless connection is less than the second wireless connection in power consumption and transmission bandwidth.

5. The control method of claim 1, wherein the first wireless connection is a Bluetooth Low Energy (BLE) channel, and the second wireless connection is a Wi-Fi channel.

6. The control method of claim 1, further comprising:

disconnecting the second wireless connection when a transmission of the map updated data is completed.

7. The control method of claim 1, wherein establishing the second wireless connection between the first electronic device and the second electronic device comprises:

by the first electronic device, functioning as a network access point and sending a network access information to the second electronic device through the first wireless connection.

8. The control method of claim 7, wherein establishing the second wireless connection between the first electronic device and the second electronic device further comprises:
by the second electronic device, sending a network access request to the first electronic device according to the network access information, so as to establish the second wireless connection.

9. The control method of claim 1, further comprising:
by at least one of the first electronic device and the second electronic device, generating the map of the physical environment by analyzing a plurality of initial images of the physical environment.

10. The control method of claim 9, further comprising:
in response to a generation of the map of the physical environment, establishing the second wireless connection to transmit a map data corresponding to the map of the physical environment between the first electronic device and the second electronic device.

11. An electronic system configured to be operated in a physical environment, and comprising:
a first electronic device and a second electronic device configured to communicate with each other through a first wireless connection established between the first electronic device and the second electronic device and configured to establish a second wireless connection different from the first wireless connection between the first electronic device and the second electronic device in response to a determination to update a map of the physical environment, wherein the map of the physical environment is determined to be updated by at least one of the first electronic device and the second electronic device;
wherein in response to the determination to update the map of the physical environment, a map updated data is generated to update the map of the physical environment and is configured to be transmitted through the second wireless connection instead of the first wireless connection.

12. The electronic system of claim 11, wherein at least one of the first electronic device and the second electronic device determines to update the map of the physical environment when detecting a difference between the map of the physical environment and a current feature point map, wherein the current feature point map is generated by at least one of the first electronic device and the second electronic device after a generation of the map of the physical environment.

13. The electronic system of claim 12, wherein the first electronic device comprises:
a first camera unit configured to capture a plurality of current images of the physical environment;
a first processor coupled to the first camera unit, configured to extract a plurality of second feature points from the plurality of current images to generate the current feature point map, configured to match the plurality of second feature points to a plurality of first feature points of the map of the physical environment to obtain an amount of the plurality of second feature points which match the plurality of first feature points and configured to determine that the current feature point map is different from the map of the physical environment when the amount is less than an amount threshold;
a first communication circuit coupled to the first processor and configured to establish the first wireless connection with the second electronic device; and
a second communication circuit coupled to the first processor and configured to establish the second wireless connection with the second electronic device.

14. The electronic system of claim 12, wherein the second electronic device comprises:
a second camera unit configured to capture a plurality of current images of the physical environment;
a second processor coupled to the second camera unit, configured to extract a plurality of second feature points from the plurality of current images to generate the current feature point map, configured to match the plurality of second feature points to a plurality of first feature points of the map of the physical environment to obtain an amount of the plurality of second feature points which match the plurality of first feature points and configured to determine that the current feature point map is different from the map of the physical environment when the amount is greater than an amount threshold;
a third communication circuit coupled to the second processor and configured to establish the first wireless connection with the first electronic device; and
a fourth communication circuit coupled to the second processor and configured to establish the second wireless connection with the first electronic device.

15. The electronic system of claim 11, wherein the first wireless connection is less than the second wireless connection in power consumption and transmission bandwidth.

16. The electronic system of claim 11, wherein the second wireless connection is disconnected when a transmission of the map updated data is completed.

17. The electronic system of claim 11, wherein the second electronic device is configured to function as a network access point and is configured to send a network access information to the first electronic device through the first wireless connection.

18. The electronic system of claim 17, wherein the first electronic device is configured to send a network access request to the second electronic device according to the network access information, so as to establish the second wireless connection.

19. The electronic system of claim 17, wherein the network access information comprises a media access control (MAC) address, a service set identifier (SSID), a physical layer (PHY) type, a bandwidth, a data rate, a channel, a frequency, an authentication information, or any combination thereof.

20. A non-transitory computer readable storage medium with a computer program to execute a control method applied to a first electronic device and a second electronic device in a physical environment, wherein the first electronic device and the second electronic device are configured to communicate with each other through a first wireless connection established between the first electronic device and the second electronic device, and the control method comprises:
by at least one of the first electronic device and the second electronic device, determining whether to update a map of the physical environment; and
in response to a determination to update the map of the physical environment, establishing a second wireless connection different from the first wireless connection between the first electronic device and the second electronic device, wherein the second wireless connection is configured to transmit a map updated data, and the map updated data is configured to update the map of the physical environment.

* * * * *